United States Patent

Carra et al.

[11] Patent Number: 5,148,882
[45] Date of Patent: Sep. 22, 1992

[54] ROBOTIC VEHICLE HAVING TILTABLE PROPULSION UNITS

[75] Inventors: Olivier Carra, Peyrins; Alain Delevallee, Ecully, both of France

[73] Assignee: Framatome, Courbevoie, France

[21] Appl. No.: 605,446

[22] Filed: Oct. 30, 1990

[30] Foreign Application Priority Data

Oct. 31, 1989 [FR] France ............... 89 14278

[51] Int. Cl.$^5$ ............................ B62D 55/12
[52] U.S. Cl. ......................... 180/9.64; 180/9.5; 901/1
[58] Field of Search ......... 180/9.64, 9.62, 9.5, 180/9.1, 8.7, 9.32, 9.46, 9.44, 9.34, 9.3, 24.07, 24.11, 264, 267, 901; 901/1

[56] References Cited

U.S. PATENT DOCUMENTS

| | | | |
|---|---|---|---|
| 3,730,287 | 5/1973 | Fletcher et al. | 180/9.5 X |
| 4,483,407 | 11/1984 | Iwamoto et al. | 180/9.5 |
| 4,702,331 | 10/1987 | Hagihara et al. | 180/9.32 |
| 4,768,601 | 9/1988 | Okano | 180/24.07 |
| 4,993,912 | 2/1991 | King et al. | 901/1 X |

FOREIGN PATENT DOCUMENTS

| | | | |
|---|---|---|---|
| 2231057 | 1/1974 | Fed. Rep. of Germany | 180/9.1 |
| 2523914 | 9/1983 | France . | |
| 203483 | 8/1988 | Japan | 180/8.7 |
| 463973 | 11/1968 | Switzerland . | |

Primary Examiner—Charles A. Marmor
Assistant Examiner—Kevin Hurley
Attorney, Agent, or Firm—Pollock, Vande Sande & Priddy

[57] ABSTRACT

An intervention vehicle of the type comprising propulsion units (4) that are tiltable by rotation about transverse carrying shafts (66), comprising advance and tilting driven shafts (8, 9) disposed coaxially inside each carrying shaft (66) and transmitting their motion via linear transmission elements (84, 90, 98) inside each propulsion unit for driving advance motion and tilting motion, and also constituting a speed reducer for the tilting motion. The invention is particularly applicable to the nuclear industry.

5 Claims, 5 Drawing Sheets

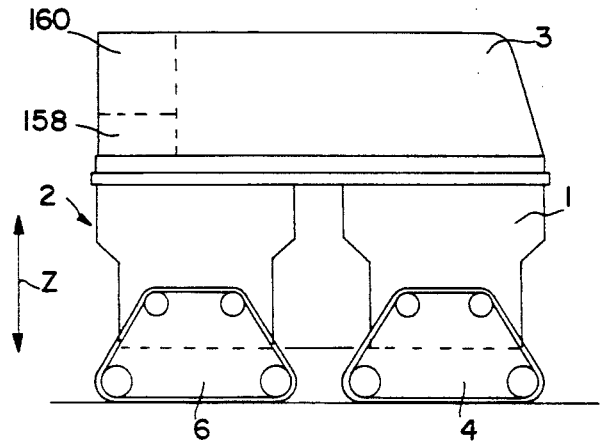
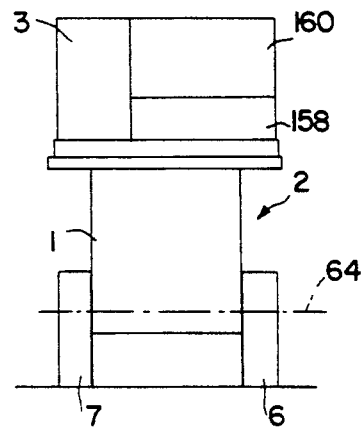
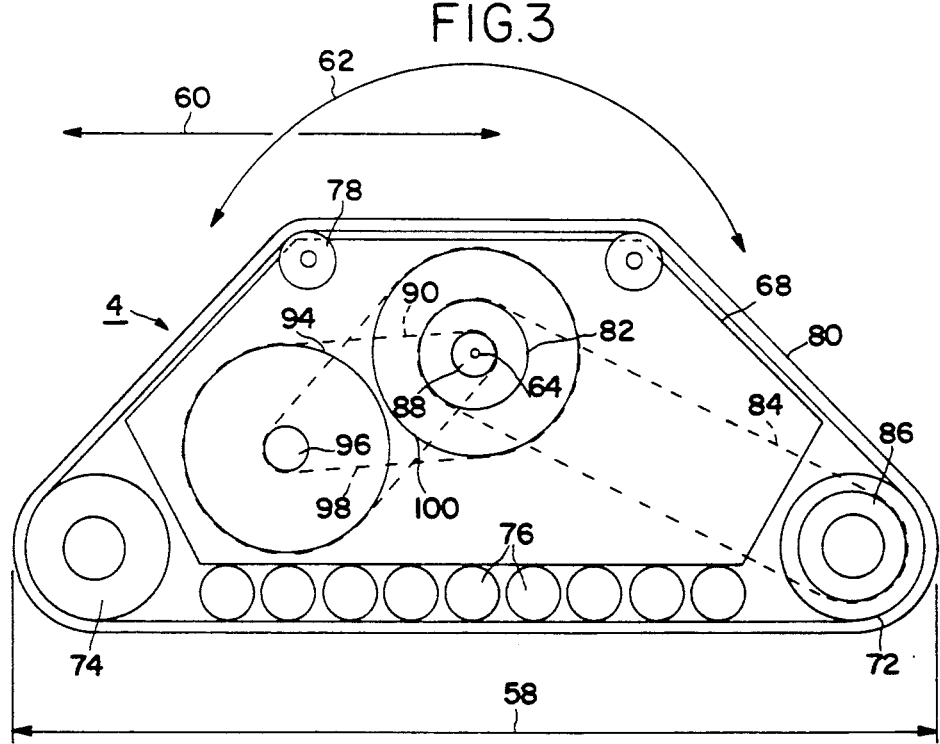

ROBOTIC VEHICLE HAVING TILTABLE PROPULSION UNITS

FIELD OF THE INVENTION

The present invention relates to a vehicle for interventions, in particular in buildings.

It is particularly applicable in industrial installations where some kind of intervention is required and where it would be dangerous or impossible for a human operator to go. The vehicle according to the present invention may then be provided with appropriate instruments such as video cameras, measuring apparatuses, and tools, thereby constituting a self-propelled robot.

The robot of the present invention may be particularly useful in a nuclear power station or in a plant for reprocessing nuclear fuel, whenever it is necessary to undertake repairs or inspection operations in zones that are subjected to high levels of ionizing radiation after certain operating incidents. However, such robots may also be useful in other industries, for example in the chemical industry if there is a danger of explosion, or for public safety operations or for surveillance purposes, or robots used for service purposes, e.g., cleaning operations, in agriculture or in military activities.

BACKGROUND OF THE INVENTION

An important quality for a vehicle of this nature is its ability to move over rough ground, i.e., ground having obstacles to be overcome. Obstacles can arise in a wide variety of forms, for example a staircase designed for humans and which must be gone up or down, or a pipe that has fallen on a floor. There are two main aspects to the safety of such vehicles when they are overcoming such obstacles. One of them is stability, i.e., the ability of the vehicle to avoid toppling over under its own weight and the weight of its load. The other problem is adherence, and this applies to each of the vehicle propulsion units, i.e. the members of the vehicle that bear against the ground for supporting the vehicle and for causing it to move or stand still. Adherence relates to the ability of these propulsion units to avoid slipping excessively on contact with the ground, even when the surface state of the ground is locally unfavorable.

Another important quality of such a vehicle is its size, in particular its transverse and longitudinal dimensions, which must be small enough to enable the vehicle to travel along various passages or corridors inside buildings that were designed for people only.

Another important quality is that the vehicle should be as light as possible.

Various vehicles have been designed for overcoming obstacles safety. A first vehicle is disclosed in ACEC's EP 197 020 which describes a remotely controlled vehicle constituting a robot for performing inspections and interventions in hostile environments. The vehicle has a drive assembly, i.e., means for applying drive and braking, which assembly is integrated in a main chassis of the vehicle. It also possesses means for transmitting the forward drive defined by said drive assembly to crawler tracks carried outside the chassis on propulsion units themselves carried by the vehicle. The vehicle is fitted with two propulsion units, one at the front and the other at the back, each of the propulsion units having two tracks mounted thereon, one on the left and the other on the right. Each propulsion unit may be tilted relative to the vehicle from the vehicle. Thus, if the robot encounters an obstacle head on, and the obstacle is of a moderate height that is substantially constant in the transverse direction, then the vehicle can pass over the obstacle while maintaining the vehicle body in a substantially horizontal position. However, if the vehicle encounters a head-on obstacle that slopes steeply sideways, then it runs the risk of toppling over sideways as it climbs over the obstacle.

A second known vehicle moves by means of legs in a "spider" type configuration, thereby enabling it to overcome a very wide variety of small obstacles. However, it moves very slowly because it is not possible, in general, to move a plurality of the vehicle's legs simultaneously.

A third known vehicle has four crawler-track propulsion units each capable of being tilted relative to the body of the vehicle. The crawler track of each propulsion unit is guided over a certain number of guide members, in particular over two wheels, one of which is a drive wheel for causing the crawler track to move forwards. These members are carried by a housing which constitutes the structure of the propulsion unit and which is assembled to the body of the vehicle in such a manner as to enable the propulsion unit to be tilted about a transverse axis. The vehicle body carries drive assemblies including motors both for tilting and for forward motion, some of which assemblies drive the drive wheels via mechanical transmission systems and others of which drive the tilting movements of the propulsion units. These assemblies also include brakes for controlling movement. The vehicle body also carries electrical power supply batteries and means for controlling the drive assemblies.

This third known vehicle is proposed by the Mitsubishi under the name MRV (Multifunctional Robot Vehicle), and is described at pages 425 and 426 in the proceedings of the "85 ICAR International Conference on Advanced Robotics", Sept. 9–10, 1985, Tokyo, Japan, organized by the Robotics Society of Japan, The Society of Biomechanisms, and the Japan Industrial Robot Association. It appears to be capable of overcoming obstacles of known shapes, and it seems to be capable of a forward speed considerably higher than that of the above-mentioned second known vehicle. Nevertheless, it appears to present the above-mentioned important qualities to an insufficient extent only.

European patent application EP-A-0 206 930 describes a fourth known vehicle comprising two pairs of propulsion units, one at the front and the other at the back, these pairs of propulsion units being carried by front and back portions of the vehicle body and each of them being constituted by two crawler track propulsion units, one on the right and the other on the left. Each propulsion unit has two wheels, a front wheel and a back wheel, a crawler track which is supported by and driven by said wheels, and track support means between the two wheels.

This known vehicle is of variable configuration or geometry, in the sense that the front and back portions of the vehicle body are hinged relative to each other about a middle transverse axis. This axis coincides with the axis of the rear wheels in the front pair of propulsion units and with the axis of the front wheels in the back pair of propulsion units.

It is disclosed that obstacles can be overcome without compromising the stability of the vehicle by displacing its center of gravity and by altering the realtive angular position of the two portions of the vehicle body.

Although this known vehicle does indeed appear to be capable of overcoming obstacles without losing stability, this capability appears to be somewhat limited.

SUMMARY OF THE INVENTION

A particular object of the present invention is to provide an intervention vehicle in a simple manner and suitable for overcoming a variety of obstacles safely, the vehicle being small in transverse size, thereby enabling it to follow passages designed for people. The invention also seeks to make it possible, by mounting tools on such a vehicle, to provide a robot suitable for performing interventions in various buildings, in particular after an accident has made the premises inaccessible to a human operator.

More particularly, the invention seeks to enable such a vehicle to impart tilting motion to its propulsion units when such motion is useful, by using means that are lightweight and compact.

To this end, the present invention provides an intervention vehicle of the type comprising propulsion units that are tiltable by rotation about transverse carrying shafts, advance and tilting driven shafts being disposed coaxially inside each carrying shaft and transmitting their motion via linear transmission elements inside each propulsion unit for driving advance motion and tilting motion, and also constituting a speed-reduction means for the tilting motion.

BRIEF DESCRIPTION OF THE DRAWINGS

An embodiment of the present invention is described below with reference to the accompanying diagrammatic figures, it being understood that the items and dispositions described and shown are given purely by way of example. When an item appears in more than one of the figures, it is designated in all of them by the same reference numeral symbol.

FIG. 1 is a side view of a vehicle in accordance with the present invention.

FIG. 2 is a back view of the same vehicle.

FIG. 3 is a side view of a propulsion unit of the vehicle, with its outer covers removed to show the transmission means inside the propulsion unit.

DESCRIPTION OF PREFERRED EMBODIMENT

Figure 4:
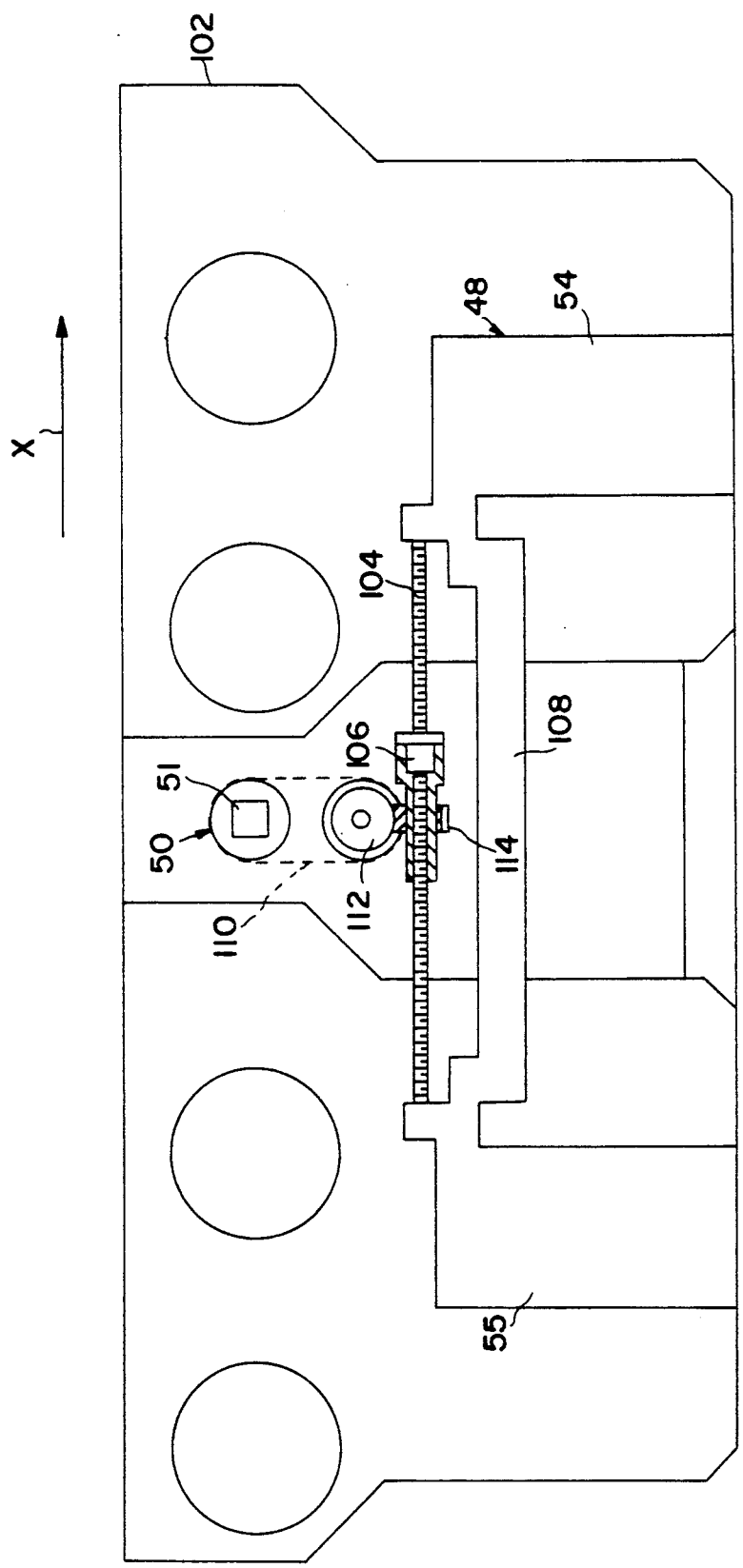
FIG. 4 is a view of one of the sides of the bottom body of the vehicle without the propulsion unit, the drive means, or the control means.
Figure 5:
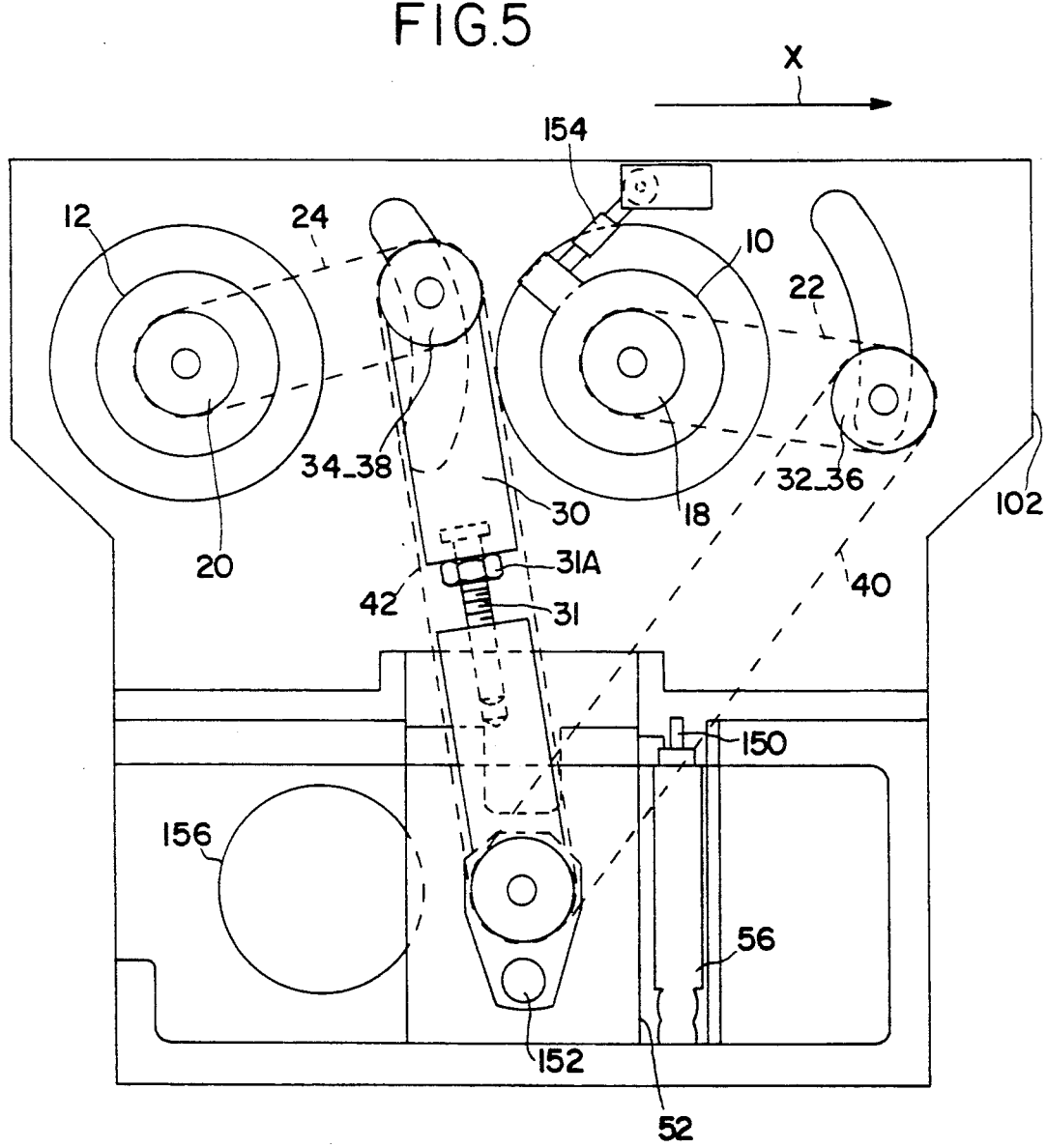
FIG. 5 is a view showing a propulsion unit assembly plate constituting a portion of the side shown in FIG. 4.
Figure 6:
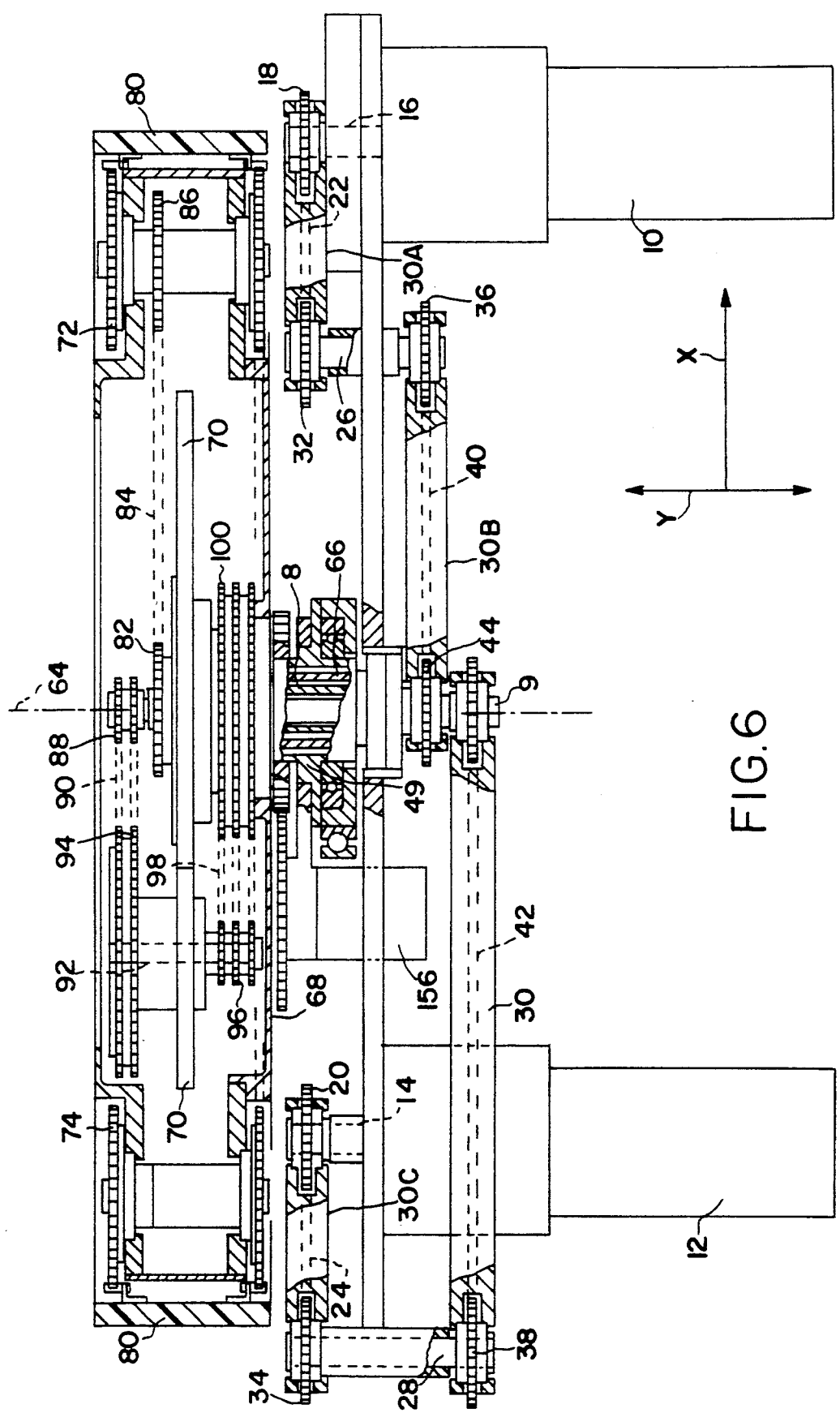
FIG. 6 is a plan view of the propulsion unit shown in FIG. 3, with the crawler track and the top guide components of the propulsion unit being removed.
Figure 6A:
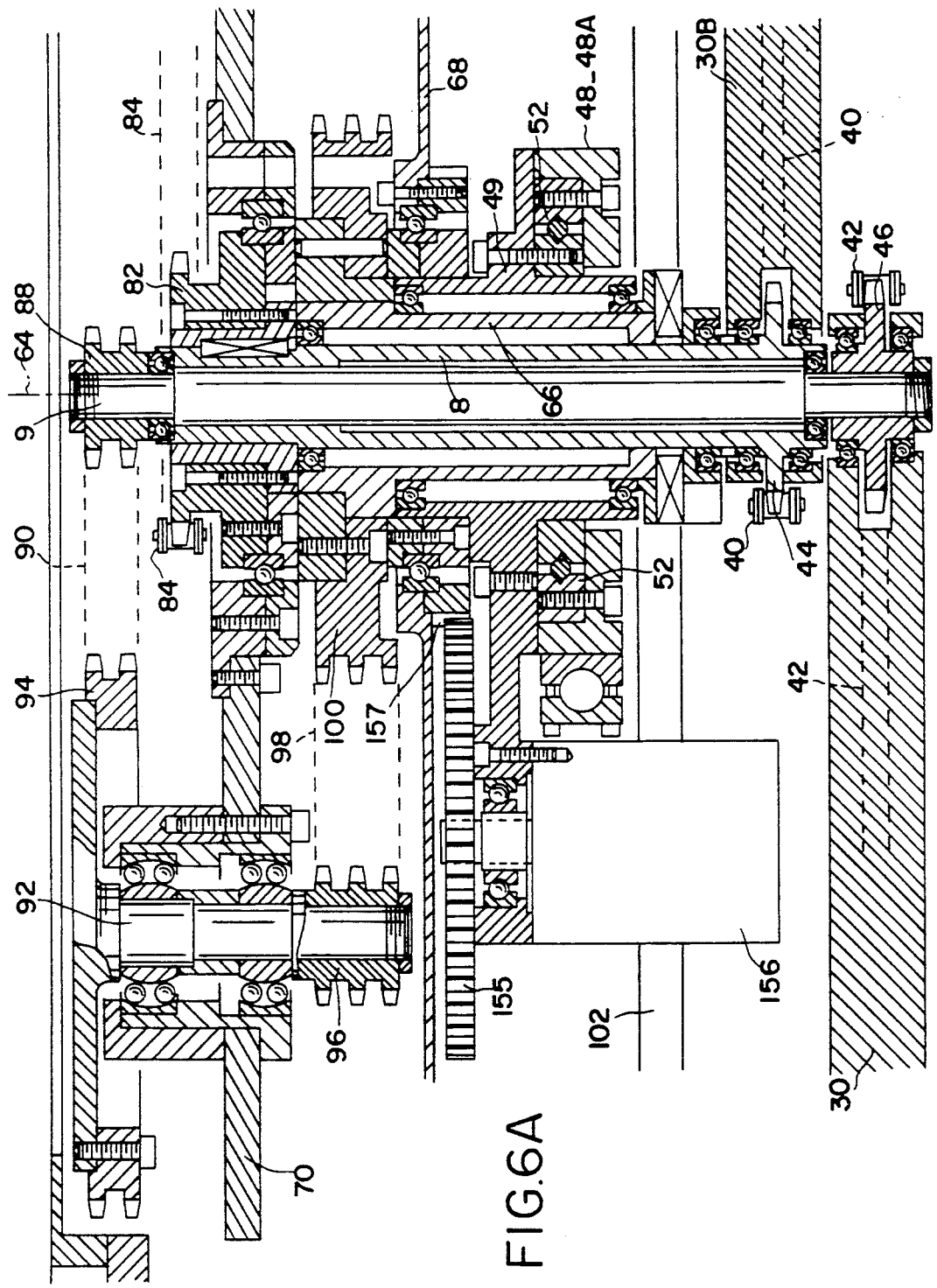
FIG. 6A shows the central portion of FIG. 6 on a larger scale and in section on a horizontal plane.

As shown in FIGS. 1 and 2, a robot vehicle of the present invention comprises a bottom body 1 and a top body 3 which together constitute a vehicle body 2. The bottom body 1 is mounted on four crawler propulsion units such as 4, 6, and 7 enabling the vehicle to move in a longitudinal direction X. The bottom of the vehicle contains electrical power supply batteries whose heavy weight and low position contribute to providing vehicle stability. As described below, motors are disposed above the batteries and serve to drive the propulsion unit.

The top body 3 is wider than the bottom body in a transverse direction Y. It contains components that are relatively light in weight, such as means 158 for forming support signals, means 160 for processing information, and communication means, together with electronic power components, exteroceptive sensors and an inertia system (not shown). A vertical direction relative to the vehicle is represented by arrow Z.

The width of the top body is equal to the overall width of the bottom body when fitted with its propulsion units, thereby providing adequate volume without increasing the overall width of the vehicle.

Some or all of the following advantageous dispositions are present in the vehicle according to the present invention.

Propulsion unit connection means (described in greater detail below) are carried by the vehicle body for carrying the propulsion units.

Each of the propulsion units such as 4 includes at least one transverse driven shaft 8 extending towards the vehicle body to receive mechanical drive from the body in the form of shaft rotation, thereby imparting forward motion to the propulsion unit for the purpose of propelling the vehicle.

The vehicle includes motors 10 and 12 carried by the vehicle body for providing said mechanical drive to each of said propulsion units in the form of rotation applied to respective transverse drive shafts 14 and 16 which rotate relative to said vehicle body.

Each driven shaft has external transmission means enabling each of said driven shafts to be driven by one of said drive shafts.

Advantageously, said external transmission means for causing one of said driven shafts 8, 9 to be driven by one of said drive shafts 14, 16 are essentially constituted by a scissor-like transmission comprising:

a transverse axis drive wheel 18, 20 mounted on said drive shaft;

a first linear transmission element 22, 24 extending from said drive wheel along a first branch of the compass-like transmission substantially perpendicularly to the axis of said wheel, and driven by said wheel;

a transverse intermediate shaft 26, 28;

spacing-maintaining means 30 for maintaining a first distance between said drive shafts 14, 16 and the corresponding intermediate shafts 26, 28 and for maintaining a second distance between said intermediate shafts and the driven shafts 8, 9, while enabling the shafts 26, 28, 8, and 9 to move perpendicularly to their own axes;

an intermediate drive wheel 32, 34 driven by said first linear transmission element and mounted on said intermediate shaft to drive said intermediate shaft;

an intermediate driven wheel 36, 38, mounted on said intermediate shaft;

a second linear transmission element 40, 42 extending from said intermediate driven wheel along a second branch of the scissor-like transmission substantially perpendicularly to the axis of said wheel and driven by said wheel; and a driven wheel 44, 46 driven by said second linear transmission element and mounted on said driven shaft to drive said shaft.

In the vehicle described by way of example, the above-mentioned drive wheels and driven wheels, together with other wheels mentioned below, are sprocket wheels whose teeth engage links in chains which constitute said linear transmission elements. However, the linear transmission elements could alternatively be constituted by belts, or by cog belts.

The external transmission means are thus made in a simple manner which enables the propulsion units to be displaced through large amplitudes vertically and longitudinally. Simultaneously, the presence of such transmission means does not increase the width of the vehicle (or increases it only a little), in particular when the vehicle has lateral propulsion units disposed on either side of the vehicle body.

Another advantageous disposition is that said propulsion unit connection means comprise, for each of said propulsion units 4:

a propulsion unit carrying structure 48 which is movable and guided relative to said vehicle body 2 to enable said structure to move in translation in a direction perpendicular to said transverse direction Y over a range which is not less than an interval 60, said structure carrying said propulsion unit; and propulsion unit positioning means 50 for causing said propulsion unit carrying structure to take up a controlled position within said range.

The displacement range may extend longitudinally only, vertically only, or in both directions, as described below.

Such a disposition makes it possible to stabilize the vehicle continuously as it moves over ground having varying slopes.

Another advantageous disposition is that said propulsion unit carrying structure comprises:

a vertical guide structure (e.g., having rails 52) carrying said propulsion unit via a suspended bearing 49 and guided vertically to enable it to perform suspension displacement over one such displacement range which is vertical; and a longitudinal guide structure 54 carrying said vertical guide structure via suspension means 56 to provide suspension for said vehicle, said longitudinal guide structure being guided longitudinally relative to said vehicle body 2 to enable it to take up any such controlled position over a displacement range 60 which is longitudinal, thereby enabling the vehicle to be stabilized by displacing its center of gravity longitudinally relative to said propulsion unit whenever said vehicle is going up or down a slope of the ground over which it is moving.

Another advantageous disposition is that said propulsion unit 4 stands on the ground over a distance 58 which extends along said longitudinal direction, with the propulsion unit being capable of bearing against the ground to support said vehicle body anywhere between the two ends of the distance 58;

said propulsion unit carrying structure 48 carrying said propulsion unit while enabling it to perform tilting movements 62 on command, which movements are constituted by rotation about a propulsion unit axis 64;

said vehicle comprising for each of said propulsion units 4:

a vehicle advance motor 10 and a tilting motor 12 provided respectively with an advance shaft 14 and a tilting shaft 16 constituting said drive shafts;

an advance driven shaft 8 and a tilting driven shaft 9 constituting said two driven shafts and extending coaxially along said propulsion unit axis 64; and external advance 22, 40 and tilting 24, 42 transmission means constituted by said two scissor-like transmissions for driving said advance and tilting driven shafts from said advance and tilting drive shafts, respectively.

Said tilting motor constitutes a tilting actuator for the propulsion unit.

Tilting a propulsion unit may have the effect of displacing the mean support point of the propulsion unit on the ground longitudinally and of displacing the axis of the propulsion unit vertically relative to the ground. Such tilting is intended to enable the vehicle to overcome an obstacle.

Another advantageous disposition is that said propulsion unit carrying structure 48 includes a propulsion unit carrying shaft 66 extending along said propulsion unit axis 64 of said vehicle body 2 as far as said propulsion unit 4, the propulsion unit comprising:

a unit housing 68, 70 guided to rotate about said carrying shaft 66;

said advance and tilting driven shafts 8 and 9 guided to rotate coaxially inside said carrying shaft;

a propulsion unit support assembly 72, 74, 76, and 80 for standing on the ground over said ground support distance 58, said assembly including at least one advance wheel 72 guided to rotate relative to said propulsion unit housing 68, 70 about a transverse axis;

internal advance transmission means 82, 84, 86 for driving at least said advance wheel from said advance driven shaft 8 in such a manner as to impart said advance motion to said propulsion unit; and internal tilting transmission means 88, 90, 92, 94, 96, 98, and 100 carried by said propulsion unit housing, rotated by said tilting driven shaft and applying rotary reaction against said propulsion unit carrying shaft in order to impart said tilting motion to said propulsion unit.

Another advantageous disposition is that said separation maintaining means for maintaining a distance between two shafts comprise:

a rod 30 bearing against both shafts 28 and 9 while allowing each of them to rotate; and separation adjustment means for giving said rod either a working length for tensioning a flexible linear transmission element such as the drive or driven chain 42 or such as a transmission belt performing the same function, or else an assembly length which is shorter than said working length in order to enable said connection element to be assembled or disassembled. These means are symbolized by a screw 31 and a nut 31A. Other rods performing similar functions are referenced 30A, 30B, and 30C. Analogous length adjusting means are associated with these other rods.

Another advantageous disposition is that for each of said lateral propulsion units 4, an assembly plate 102 of the propulsion unit is removably fixed to said vehicle body 2, the plate extending in said longitudinal and vertical directions X and Z and carrying said advance and tilting motors and drive shafts 10, 12 and 14, 16 together with said external advance and tilting transmission means 22, 40 and 24, 42.

This assembly plate carries the longitudinal guide structure such as 54 which carries an intermediate portion 48A of the carrying structure 48 which itself carries the vertical guide structure having the rails 52. This structure carries a rectangular suspended bearing 49 which is rotatably mounted on the carrying shaft 66.

The vehicle has four of said lateral propulsion units, namely a front right unit 4, a front left unit, a back right unit 6, and a back left unit 7, and four of said longitudinal guide structures, namely a front right structure 54, a front left structure, a back right structure 55, and a back left structure corresponding to respective ones of the four propulsion units. In this case, another advantageous disposition is that the said positioning means of a propulsion unit include position coordination means 50, 104 for coordinating the positions that two of said propulsion units are instructed to take up by means of the two said corresponding horizontal guide structures 54 and 55.

Another advantageous disposition is that for each of the two pairs of propulsion units on one side or the other of the vehicle, i.e. for the front right and back right propulsion units 4 and 6 or for the front left and back left propulsion units, said propulsion unit positioning means comprise:

a longitudinal linking spacer 108 interconnecting the two horizontal guide structures 54 and 55 corresponding to the two propulsion units of the pair;

a longitudinal positioning screw 104 also interconnecting the two guide structures;

a rotary drive nut 106 co-operating with said screw and fixed in longitudinal position relative to said vehicle body 2; and a motor 50 for rotating said drive nut.

This motor constitutes a propulsion unit positioning actuator common to said two pairs. By means of a chain 110 it drives a transverse shaft 112 which drives one of said two drive nuts such as 106 at each of its two ends, said nuts being driven via respective angle gear drive devices such as 114.

Another advantageous disposition is that said internal tilting transmission means comprise at least:

a first drive wheel 88 mounted on said tilting driven shaft beyond said carrying shaft 66;

a first linear transmission element 90 driven by said first wheel;

an intermediate internal tilting transmission shaft 92 extending transversely and guided to rotate relative to said propulsion unit housing; a first driven wheel 94 mounted on said intermediate shaft and driven by said first liner transmission element to rotate said shaft;

a second drive wheel 96 mounted on said intermediate shaft;

a second linear transmission element 98 driven by said second drive wheel; and a tilting support driven wheel 100 co-operating with said second transmission element and fixed, at least angularly, on said carrying shaft to cause said intermediate shaft and said propulsion unit housing to rotate about said carrying shaft, thereby driving said tilting motion.

Another disadvantageous disposition is that said drive wheels 88 and 96 of the internal tilting transmission means have smaller diameters than said driven wheels 94 and 100 so that said transmission means also constitute speed-reducing means so that the speed of rotation of said tilting motion is less than that of said tilting driven shaft, thereby limiting the forces that need to be applied by said tilting motor 12 to said external transmission means when driving said tilting motion.

In said internal transmission means, as in said external transmission means, the drive wheels and the driven wheels are constituted by sprocket wheels and said linear transmission elements are constituted by chains.

Another disposition is that said ground support assembly in each of said lateral propulsion units comprises:

a crawler track 80 bearing against the ground;

means 72, 74, 76, and 78 for guiding the crawler track; and an advance wheel 72 rotating about a transverse axis for driving said track.

More precisely, this assembly comprises the advance wheel 72 and a guide wheel 74 at opposite ends of said support distance, intermediate support wheels such as 76, and deflection wheels such as 78 for guiding the track 80, with ground contact being made solely by the track 80. The track has inside teeth and the wheels 72 and 74 are sprocket wheels whose teeth engage in the teeth of the track.

Another advantageous disposition is that said internal advance transmission means comprise:

a drive wheel such as a first sprocket wheel 82 carried by said advance driven shaft 8 beyond said carrying shaft 66;

a linear transmission element such as a chain 84 driven by said first sprocket wheel; and a driven wheel such as a second sprocket wheel 86 fixed to said advance wheel 72 and driven by said chain to drive advance motion of the propulsion unit 4.

These two wheels are shown as having the same diameter, but their diameters could be different, e.g. to constitute a speed reduction gear.

Other advantageous dispositions adopted in the same vehicle relate to the signal processing and measurement means with which the vehicle is equipped. In this context, it is recalled that each propulsion unit is supported by the ground by means of a set of forces which may usefully be represented, at least in part, by a certain number of parameters. These parameters are referred to below as "support parameters".

One of these advantageous dispositions is that, in order to determine a certain number of ground support parameters of one of said propulsion units 4, force signals are formed representative of the forces applied to said propulsion unit from the body of the vehicle 2, and these force signals are processed in order to form support signals representative of the support parameters to be determined.

More particularly, at least three of said force signals are formed representative of the forces applied to any one of said propulsion units 4 by said vehicle body 2, and these force signals are processed to form three of said support signals representing three of said support parameters which themselves represent the component of said support force of said propulsion unit in a longitudinal vertical plane.

To this end, the vehicle includes force sensors 150, 152, and 154 for forming said force signals; and support signal forming means 158 receiving and processing the force signals to form said support signals. Said support signals represent, for example, said component of said support force in terms of its angle, the longitudinal position of its point of application on the ground, and its magnitude.

Another advantageous disposition is that said carrying shaft 66 is mounted in the suspended bearing 49 which constitutes a portion of the carrying structure 48 in such a manner as to be guided in rotation about said propulsion unit axis 64. More particularly, the carrying shaft 66 is mounted to rock in the suspended bearing 49 which is guided vertically relative to the carrying structure 48 by means of the vertical guide structure 52. The vehicle then includes a tilting force sensor 152 which constitutes one of said force sensors and which is mounted between said carrying shaft and a non-rotating portion of the carrying structure so as to prevent said shaft from rotating, thereby providing a tilting force signal representative of a tilting moment applied to said propulsion unit 4 by said vehicle body 2.

Another advantageous disposition is that an advance force sensor 154 is associated with said advance motor 10 or with said external advance transmission means 22, 40 to provide an advance force signal representative of an advance torque applied by said external advance transmission means to said advance driven shaft 8, such that said force signal is suitable for use in determining the component of said support force which is tangential to the propulsion unit in a longitudinal vertical plane.

Another advantageous disposition is that a vertical force sensor 150 is associated with said vertical guide structure to provide a vertical force signal representative of a relative vertical force applied to said propulsion unit 4 by said vehicle body 2 in a relative vertical direction related to said vehicle body, such that said vertical force signal is suitable for use in determining the force of said support force which is normal to the support surface of the propulsion unit.

Another advantageous disposition is that said vehicle further includes configuration sensors 156 for providing configuration signals representative of configuration parameters such as the position and/or the angle of each of said propulsion units relative to said vehicle body 2 and/or the orientation of the vehicle body relative to the vertical, said support signal forming means 148 also receiving and processing said configuration signals in order to form said support signals.

One of said configuration sensors is an angle sensor 156 carried by the vehicle body 2. It measures the angle of rotation of the housing 70 of the propulsion unit 4 about the propulsion unit axis 64 by means of a gear wheel 155 which is coaxial with the sensor 156 and which co-operates with a gear wheel 157 fixed to the housing 70. This sensor provides a propulsion unit angle signal representative of the angle of the propulsion unit relative to the vehicle body.

Another of said configuration sensors is a longitudinal position sensor 51 (see FIG. 4) which measures the longitudinal position of said set of propulsion units relative to the vehicle body 2 and which provides a longitudinal position signal.

It is apparent from the above description that the vehicle includes propulsion unit displacement actuators 12 and 50 for displaceing said propulsion units relative to said vehicle body, and means for forming support signals representative of said support parameters.

Another advantageous disposition is that it further includes safety control means constituting a portion of the information processing means 160 and making use of said support signals for controlling said displacement actuators so as to improve vehicle safety.

These displacement actuators comprise said positioning actuator constituted by the motor 50 and the four tilting actuators constituted by the four tilting motors such as 12.

Another advantageous disposition is that said safety control means 160 make use not only of said support signals but also of speed signals representative of the speeds of said propulsion units 4, said vehicle including speed sensors for providing said signals.

Another advantageous disposition is that said safety control means 160 control not only said displacement actuators 12, 50, but also said advance motors 10. More precisely, said control means evaluate at each instant firstly a current degree of safety, i.e., they determine in real time values for safety parameters representative, in particular, of vehicle stability and adherence. This is determined, in particular, as a result of some of said support parameters. For example, stability depends on the position of the vertical projection of the center of gravity onto the support polygon defined by the support points of the propulsion units. For each of the propulsion units, adherence depends on the angle made by the support force passing through said propulsion unit on the ground and relative to a support surface. Secondly, the control means 160 evaluate the influence that displacement of the propulsion units or changes in the advance torques will have on the safety parameters. Finally, the control means issue commands for optimizing the safety parameters.

We claim:

1. An intervention vehicle comprising:
   (a) a vehicle body (2) having a length and a width extending respectively along a longitudinal direction (X) and a transverse direction (Y);
   (b) propulsion units (4, 6) resting on the ground in operation to suport said vehicle body and to have an advance motion along said longitudinal direction;
   (c) said vehicle comprising for each of said propulsion units (4):
      (i) a propulsion unit carrying shaft (66) carried by said vehicle body (2) and carrying a propulsion unit housing (68, 70) while enabling it to perform a tilting motion (62) on command about a transverse tilting axis (64) of said propulsion unit;
      (ii) an advance motor (10) and a tilting motor (12) carried by said vehicle body (2); and
      (iii) an advance driven shaft (8) and a tilting driven shaft (9) driven by said advance motor and by said tilting motor, respectively, and extending coaxially into said propulsion unit along said tilting axis inside said propulsion unit carrying shaft;
   (d) each said propulsion unit further comprising:
      (i) an advance wheel (72) guided to rotate relative to said propulsion unit housing (68, 70) about a transverse axis at a distance from said tilting axis in such a manner as to impart said advance motion to said propulsion unit;
      (ii) internal advance transmission means (82, 84, 86) for driving said advance wheel from said advance driven shaft (8); and
      (iii) internal tilting transmission means;
   (e) said internal tilting transmission means comprising
      (i) a first drive wheel (88) mounted on said tilting driven shaft beyond said carrying shaft (66) for rotating at a first tilting transmission angular speed;
      (ii) a first linear transmission element (90) driven by said first wheel;
      (iii) an intermediate shaft (92) extending transversely and guided to rotate relative to said propulsion unit housing;
      (iv) a first driven wheel (94) mounted on said intermediate shaft and driven by said first linear transmission element to rotate said shaft;
      (v) a second drive wheel (96) mounted on said intermediate shaft;
      (vi) a second linear transmission element (98) driven by said second drive wheel; and
      (viii) a tilting support driven wheel (100) cooperating with said second transmission element and fixed, at least angularly, on said carrying shaft to cause said intermediate shaft and said propulsion unit housing to rotate about said carrying shaft in such a manner as to drive said tilting motion at a tilting angular speed which is less than said first tilting transmission angular speed.

2. A vehicle according to claim 1, wherein each of said propulsion units (4) stands on the ground over a ground support distance (58) which extends along said longitudinal direction, with the propulsion unit being capable of bearing against the ground to support said vehicle body at any point of said ground support distance (58).

3. A vehicle according to claim 1, wherein said first and second drive wheels (88, 96) of the internal tilting transmission means have smaller diameters than said first and second driven wheels (94, 100), respectively.

4. A vehicle according to claim 1, wherein said ground support assembly in each of said lateral propulsion units comprises:
 (a) a crawler track (80) bearing against the ground;
 (b) means (72, 74, 76, 78) for guiding said crawler track; and
 (c) an advance wheel (72) rotating about a transverse axis for driving said track.

5. A vehicle according to claim 4, wherein said internal advance transmission means comprise:
 (a) a drive wheel (82) carried by said advance driven shaft (8) beyond said carrying shaft (66);
 (b) a linear transmission element (84) driven by said drive wheel; and
 (c) a driven wheel (86) fixed to said advance wheel (72) and driven by said transmission element to drive advance motion of said propulsion unit (4).

* * * * *